(12) United States Patent
Runkel

(10) Patent No.: US 11,400,542 B2
(45) Date of Patent: Aug. 2, 2022

(54) METHOD AND DEVICE FOR PRODUCING A CONTINUOUS STRIP-SHAPED COMPOSITE MATERIAL

(71) Applicant: SMS group GmbH, Düsseldorf (DE)

(72) Inventor: Thomas Runkel, Siegen (DE)

(73) Assignee: SMS group GmbH, Düsseldorf (DE)

( * ) Notice: Subject to any disclaimer, the term of this patent is extended or adjusted under 35 U.S.C. 154(b) by 304 days.

(21) Appl. No.: 16/348,992

(22) PCT Filed: Nov. 16, 2017

(86) PCT No.: PCT/EP2017/079413
§ 371 (c)(1),
(2) Date: May 10, 2019

(87) PCT Pub. No.: WO2018/091571
PCT Pub. Date: May 24, 2018

(65) Prior Publication Data
US 2019/0270160 A1     Sep. 5, 2019

(30) Foreign Application Priority Data

Nov. 18, 2016 (DE) ...................... 10 2016 222 813.7
Dec. 7, 2016 (DE) ...................... 10 2016 224 412.4
Dec. 28, 2016 (DE) ...................... 10 2016 226 277.7

(51) Int. Cl.
*B23K 20/04* (2006.01)
*B21B 1/22* (2006.01)
(Continued)

(52) U.S. Cl.
CPC ................ *B23K 20/04* (2013.01); *B21B 1/02* (2013.01); *B21B 1/04* (2013.01); *B21B 1/22* (2013.01);
(Continued)

(58) Field of Classification Search
CPC ...... B23K 20/04; B23K 2103/04; B21B 1/02; B21B 1/04; B21B 1/22; B21B 11/142;
(Continued)

(56) References Cited

U.S. PATENT DOCUMENTS 2,753,623 A     7/1956  Boessenkool et al.
3,331,120 A *  7/1967  Frost ...................... B23K 20/04
                                                                228/126
(Continued)

FOREIGN PATENT DOCUMENTS

CN     201346897 Y     11/2009
CN     201385171 Y     1/2010
(Continued)

OTHER PUBLICATIONS

Chinese Office Action dated Sep. 11, 2020, in connection with corresponding CN Application No. 2017800713405 (23 pp., including machine-generated English translation).
(Continued)

*Primary Examiner* — Scott R Kastler
(74) *Attorney, Agent, or Firm* — Maier & Maier, PLLC

(57) ABSTRACT

A method and a device for producing a continuous strip-shaped composite material. The device has at least one first casting machine, using which a continuous strand is produced, in particular from steel, at least one rolling stand, which is arranged in line with the first casting machine and downstream thereof. A fully solidified slab of the strand produced using the first casting machine can be hot rolled, and at least one second casting machine, using which a further continuous strand is produced from metal. Between the casting machines, on the one hand, and the rolling stand, on the other hand, a merging unit is arranged, by means of which the slabs can be moved in the direction toward each other in the hot state. The rolling stand is designed as a
(Continued)

roll-cladding unit, by which a composite formed from the merged slabs can be hot rolled.

17 Claims, 4 Drawing Sheets

(51) Int. Cl.
| | |
|---|---|
| *B22D 11/14* | (2006.01) |
| *B22D 11/16* | (2006.01) |
| *C21D 8/02* | (2006.01) |
| *C21D 9/56* | (2006.01) |
| *C21D 9/60* | (2006.01) |
| *B21B 1/04* | (2006.01) |
| *B21B 1/02* | (2006.01) |
| *B32B 15/01* | (2006.01) |
| *B21B 1/46* | (2006.01) |
| *B23K 20/26* | (2006.01) |
| *B21D 39/03* | (2006.01) |
| *B23K 103/04* | (2006.01) |
| *B21B 1/38* | (2006.01) |
| *B23K 101/16* | (2006.01) |
| *B21B 1/26* | (2006.01) |
| *B21C 47/22* | (2006.01) |

(52) U.S. Cl.
CPC .............. *B21B 1/466* (2013.01); *B21D 39/03* (2013.01); *B22D 11/142* (2013.01); *B22D 11/16* (2013.01); *B23K 20/26* (2013.01); *B32B 15/011* (2013.01); *C21D 8/0205* (2013.01); *C21D 8/0215* (2013.01); *C21D 8/0226* (2013.01); *C21D 9/561* (2013.01); *C21D 9/562* (2013.01); *C21D 9/60* (2013.01); *B21B 1/26* (2013.01); *B21B 2001/028* (2013.01); *B21B 2001/225* (2013.01); *B21B 2001/383* (2013.01); *B21C 47/22* (2013.01); *B23K 2101/16* (2018.08); *B23K 2103/04* (2018.08); *B32B 2250/02* (2013.01)

(58) Field of Classification Search
CPC . B21B 11/16; B21B 15/011; B21B 2001/028; B21B 2001/225; B32B 15/021; C21D 8/0205; C21D 8/0215; C21D 8/0226; C21D 9/561; C21D 9/562; C21D 9/60
See application file for complete search history.

(56) References Cited

U.S. PATENT DOCUMENTS

| | | | |
|---|---|---|---|
| 3,620,880 A | | 11/1971 | Lemelson |
| 3,683,471 A | * | 8/1972 | Lemelson ............... B21C 31/00 29/330 |
| 4,260,095 A | * | 4/1981 | Smith ................ B23K 26/0846 228/126 |
| 4,806,438 A | | 2/1989 | Hinotani |
| 8,535,813 B2 | | 9/2013 | Becker |
| 2019/0270160 A1 | * | 9/2019 | Runkel .................. B23K 20/04 |

FOREIGN PATENT DOCUMENTS

| | | |
|---|---|---|
| CN | 102310077 A | 1/2012 |
| CN | 103072358 A | 5/2013 |
| CN | 105980072 A | 9/2016 |
| DE | 1 271 519 B | 6/1968 |
| DE | 1 427 387 A1 | 3/1969 |
| DE | 1 527 597 A1 | 8/1969 |
| DE | 2 125 250 A1 | 11/1972 |
| DE | 2 909 418 A1 | 9/1979 |
| DE | 33 34 355 C1 | 5/1985 |
| DE | 3787510 T2 | 4/1994 |
| DE | 10011758 A1 | 9/2001 |
| DE | 101 24 594 A1 | 12/2002 |
| DE | 10 2016 205 221 A1 | 10/2017 |
| EP | 0 004 063 B1 | 7/1981 |
| EP | 0 053 600 B1 | 9/1984 |
| EP | 0 315 576 A1 | 5/1989 |
| EP | 0 201 202 B1 | 7/1989 |
| EP | 0 366 646 A1 | 5/1990 |
| EP | 0 608 905 A1 | 8/1994 |
| EP | 1 690 606 B1 | 10/2008 |
| EP | 1 980 345 A1 | 10/2008 |
| FR | 2 323 492 A1 | 4/1977 |
| JP | S54-24560 U | 2/1979 |
| JP | S55-70491 A | 5/1980 |
| JP | S55-113525 A | 9/1980 |
| JP | S55-114432 A | 9/1980 |
| JP | S56-62602 A | 5/1981 |
| JP | S56-102302 A | 8/1981 |
| JP | S56-122681 A | 9/1981 |
| JP | S58-188551 A | 11/1983 |
| JP | S59-185588 A | 10/1984 |
| JP | S61-283476 A | 12/1986 |
| JP | S62-199280 A | 9/1987 |
| JP | S63-112084 A | 5/1988 |
| JP | S63-203288 A | 8/1988 |
| JP | H02-34205 A | 2/1990 |
| JP | H02-200383 A | 8/1990 |
| JP | H07-24659 A | 1/1995 |
| JP | 4084682 B2 | 4/2008 |
| JP | 4118185 B2 | 7/2008 |
| JP | 4138884 B2 | 8/2008 |
| JP | 5293605 B2 | 9/2013 |
| KR | 10-1653742 B1 | 9/2016 |

OTHER PUBLICATIONS

Chinese Search Report dated Aug. 27, 2020, in connection with corresponding CN Application No. 2017800713405 (3 pp.).
International Search Report dated Feb. 19, 2018 in corresponding International application No. PCT/EP2017/079413; 9 pages.
International Preliminary Examination Report on Patentability dated Nov. 13, 2018 in corresponding International application No. PCT/EP2017/079413; 64 pages.

* cited by examiner

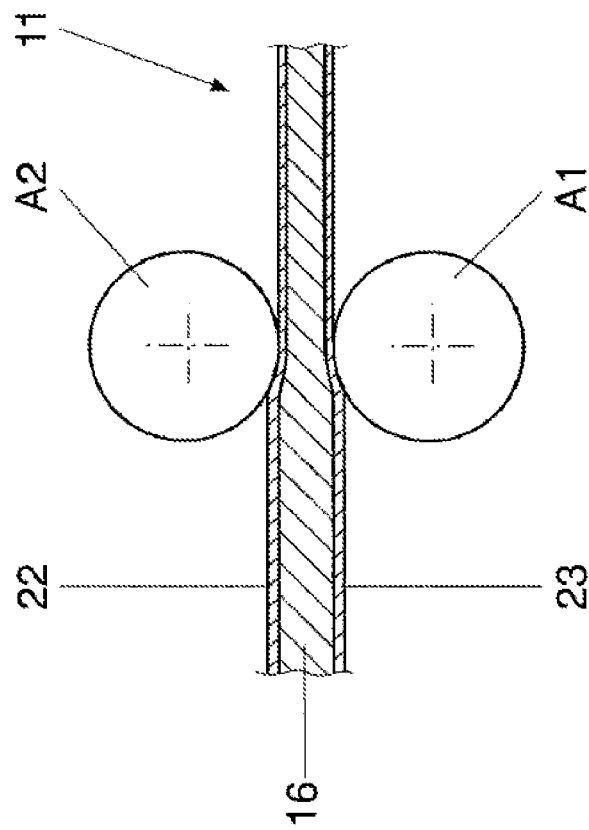
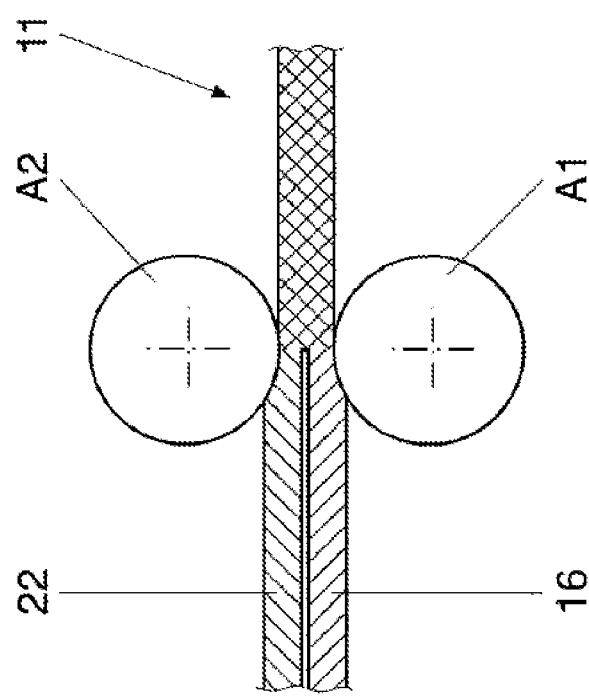
Fig. 4b
Fig. 4a

METHOD AND DEVICE FOR PRODUCING A CONTINUOUS STRIP-SHAPED COMPOSITE MATERIAL

FIELD

The invention relates to a method for producing a continuous strip-shaped composite material.

BACKGROUND

Joining together at least two material partners made of metal or steel by means of roll welding or hot welding to form a composite material is known according to the prior art. This is disclosed, for example, in EP 1 690 606 B1, EP 201 202 B1, EP 053 600 B1, and EP 04 063 B1. Accordingly, a plate-shaped sheets are firstly applied to one another, subsequently welded to one another to form a plate package, and then hot rolled to form a roll-cladded hot strip or composite material. Such a technology is accompanied by the disadvantage that the intermediate step, according to which the plate-shaped sheets laid on one another firstly have to be welded to one another, means additional effort for the production sequence and limits the maximum production capacity.

Casting-rolling plants are known according to the prior art, using which steel strips are continuously produced using a casting machine and downstream rolling mill stands. During processing of steel, hot rolling of the material is typically performed at a temperature above the recrystallization temperature of steel, i.e., at a temperature of, for example >720° C. A maximum possible material speed and the production capacity resulting therefrom are limited because of the capacity of an individual casting machine which is used in such casting-rolling plants. A further disadvantage of such known casting-rolling plants—because of the limited material speed—is a relatively long dwell time of the material in the plant, which results in cooling of the material and requires an additional heat supply for the material. The costs of such a heat supply worsen the cost-effectiveness of such casting-rolling plants. Conventional continuous casting-rolling plants, in which a single casting machine is used, are therefore only usable for limited requirements.

Bringing strip-shaped materials into contact with one another and bonding them to one another by means of a roller pair, through which the strip-shaped materials applied to one another are guided, is known from each of U.S. Pat. No. 3,620,880 A and EP 0 608 905 A. The strip-shaped materials do not consist of the material steel and are not heated once again before they are bonded to one another by means of the roller pair.

SUMMARY

The invention is accordingly based on the object of optimizing the production of a continuous metal strip in the form of a strip-shaped steel composite material, in which at least one casting machine is used, with respect to the cost-effectiveness and/or the possible product spectrum.

A method according to the present invention is used for producing a continuous material strip in the form of a strip-shaped composite material, having the following steps: producing at least one continuous strand, from steel or from a steel alloy, by way of a first casting machine, and hot rolling a slab which is formed due to solidification of the strand. The following steps are carried out for this purpose: (i) producing at least one further continuous strand from steel or from a steel alloy by way of at least one second casting machine; (ii) merging and/or moving slabs in the direction toward each other, which have been formed by solidification from the strands which have been produced by the first casting machine and by the second casting machine, in the hot state, in which these slabs each have a temperature of at least 720° C.; and (iii) hot rolling a composite formed from the merged and/or moved-together slabs, so that a single continuous strip-shaped composite material thus results by roll cladding, wherein both slabs formed from the strands produced using the first/second casting machine are heated by means of an induction heater before step (iii) to intentionally influence the temperature of the slabs and adapt it to the temperature of the respective other slab.

In the same manner, the invention provides a device for producing a continuous metal strip in the form of a strip-shaped composite material. This device comprises at least one first casting machine, using which a continuous strand is produced, in particular from steel, and at least one rolling stand, which is arranged in line with the first casting machine and downstream thereof, wherein a fully solidified slab of the strand produced using the first casting machine can be hot rolled. At least one second casting machine is provided, using which a further continuous strand is produced from metal, wherein the second casting machine is arranged in line with the rolling stand and upstream thereof. Between the casting machines, on the one hand, and the rolling stand, on the other hand, a merging unit is arranged, by means of which a slab which has formed by solidification from a strand produced using the first casting machine and a slab which has formed by solidification from a strand produced using the second casting machine, can be moved toward each other in the hot state. The rolling stand is formed as a roll-cladding unit, by means of which a composite formed from the merged slabs can be hot rolled, so that a single metal strip in the form of a continuous strip-shaped composite material thus results by roll-cladding. At least one temperature influencing unit in the form of an induction heater, by means of which the surface temperature of at least one slab formed from the strands can be influenced on a side opposing the respective other slab, is provided between the merging unit and a roll-cladding unit arranged directly downstream thereof.

The following aspects are to be understood as follows in the meaning of the present invention:

The feature "slab" is to be understood to mean that this is a cast strand made of metal which is already substantially completely fully solidified, so that rolling of this slab is possible without the risk existing in this case that still liquid components of the metal will be squeezed out from the interior to the exterior. Such a slab can be formed as an endless profile which is produced or cast by means of a casting machine, for example, by continuous casting.

The feature "merging slabs" as defined, for example, for step (ii) of the method according to the invention is to be understood to mean that in this case the slabs are moved in the direction toward each other. This can mean that the individual slabs do not yet touch or contact during step (ii) or at its end. In any case, the individual slabs are moved in the direction toward each other by the merging according to step (ii), which is carried out in the merging unit, in such a way that subsequently, specifically in step (iii) of the method according to the invention and/or in the roll-cladding unit of the device according to the invention, a composite formed from the merged slabs can be hot-rolled.

The attribute "hot" or the definition "in the hot state" which is mentioned in conjunction with step (ii) relates to the temperature of the material partner or the slabs and is to be understood to mean that this temperature is above the recrystallization temperature (for example, 720° C.).

The invention is based on the essential finding that the casting-rolling process, in which a single steel strip in the form of a continuous strip-shaped composite material is produced by hot rolling and/or roll cladding of at least two slabs merged in the hot state, is improved by the use of at least one second casting machine with respect to both the production capacity and also an expansion of the field of use and/or the possible product spectrum. The use of at least two casting machines which are arranged before or upstream of a rolling mill in the form of a roll-cladding unit, and the hot rolling of slabs which have formed by solidification from the strands produced using these casting machines advantageously increases the overall throughput for the casting-rolling process and also enables an increase of the achievable final thicknesses, for example, of up to 10 mm. The device according to the invention can be referred to as a "RR plant". Furthermore, the use of various materials which are cast using the casting machines enables the implementation of specific material properties of the produced continuous strip-shaped composite material.

Steel or steel alloys can be used as the material which is cast using the casting machines. It is possible in principle for the present invention that the strands produced using the individual casting machines consist of different material qualities. For example, different steel qualities can be cast in the individual casting machines, which are then bonded in step (iii) of the method according to the invention to form a single continuous strip-shaped composite material.

In one advantageous refinement of the method according to the invention, before step (ii), a speed of at least one slab which is formed by solidification from the strands formed using the first and/or second casting machine is intentionally influenced. This influencing of the speed of the at least one slab can take place in either a controlled or regulated manner, as a function of further processing variables of the casting-rolling process, which will be explained in detail hereafter. A compensation rolling stand, which is arranged in line between the first and/or second casting machine and the merging unit, can be provided for influencing the speed of the at least one slab to carry out the method according to the invention and/or for the device according to the invention, wherein the slab is guided through this compensation rolling stand to influence its speed. Two separate compensation rolling stands can expediently be provided, which are each arranged in line with the first or second casting machine, respectively, and are provided downstream thereof.

The hot rolling of the two slabs which have formed by solidification from the strands produced using the casting machines, and the desired bonding of these two slabs to form a single continuous strip-shaped composite material by means of hot rolling is improved in that the temperature of these two slabs is adapted to one another, before the hot rolling of the slabs takes place in step (iii). This heating, which is carried out for the slabs in any case before step (iii), can also take place for at least one of the slabs such that it is heated before step (ii), to intentionally influence the temperature of this slab and adapt it to the temperature of the respective other slab. In this case, it is also possible to carry out this heating for both slabs simultaneously. For heating at least one slab, at least one heating unit is provided, which can be arranged upstream of the merging unit and/or as a part thereof, wherein the slab(s) is/are guided to this heating unit. A particularly high introduction of energy may be achieved, for example, using a heating unit in the form of an induction heater, combined with the advantage that it only occupies a small installation space, with high energy density at the same time.

In one advantageous refinement of the invention, it can be provided that the slabs formed by solidification from the strands produced using the casting machine are laterally guided before step (ii) to thus align the slabs in relation to one another. In the same manner, this can also take place during step (ii) and/or before step (iii). For this purpose, at least one lateral influencing unit is provided, which can be arranged upstream from the merging unit and/or as a part thereof. Additionally or alternatively, this lateral influencing unit can also be arranged upstream of the roll-cladding unit. The lateral influencing unit can be designed, for example, in the form of a guide roller or a guide ruler, with which the lateral edges of the slabs come into contact in order to be laterally aligned in relation to one another as explained.

In one advantageous refinement of the invention, the above-mentioned lateral influencing unit can be designed in the form of a guide ruler, which is moved by an actuator in the direction of the strip center, in particular using a predetermined force. An alignment of the two slabs in the direction of the strip center is also possible in this way.

In one advantageous refinement of the invention, it can be provided that a lateral influencing unit, preferably in the form of a guide ruler, is also provided downstream of the roll-cladding unit. For this case, it is ensured that the produced continuous strip-shaped composite material is also laterally guided after step (iii), for example, to guide the composite material centered in the middle of a rolling pass through the rolling train and its associated rolling stands. For this purpose, it can also be provided that a guide ruler is moved using a predetermined force in the direction of the strip center to contact the produced composite material on its lateral edges and guide it (possibly back in the direction of the strip center).

The bonding of the individual material partners by means of the hot rolling in step (iii) and/or by the roll-cladding unit is optimized if at least one slab which has been formed by solidification from the strands produced using the first/second casting machine is suitably cleaned before step (iii), specifically on the surface of this slab which is opposite to the respective other slab and thus comes into contact with it during the hot rolling in step (iii). Preferably, both slabs which have been formed by solidification from the strands produced using the first and second casting machines are cleaned on the surfaces thereof opposite to each other. For this purpose, at least one cleaning unit is provided for the device according to the invention, which is arranged between the casting machines, on the one hand, and the merging unit, on the other hand. The cleaning unit can optionally also be formed as part of the merging unit. Such a cleaning of the slabs can be performed mechanically, for example, by blasting, brushing, grinding, planing, milling, or the like. Additionally or alternatively thereto, it is possible to carry out the cleaning of the slab(s) in the form of descaling, wherein a fluid, preferably high-pressure water, is applied to the surfaces of the slab(s). For this case, the cleaning unit is designed as a descaling unit, by means of which a fluid can be discharged, preferably under high pressure, onto the surface of at least one slab. The descaling of the slab(s) is advisable in particular for the case in which a strand, from which a slab is formed by solidification, consists of steel or a steel alloy.

The bonding of the individual material partners by means of the hot rolling in step (iii) and/or by the roll-cladding unit is further optimized in that before step (iii) and/or upstream of the roll-cladding unit, a surface temperature of at least one slab, which has formed by solidification from the strands produced using the first/second casting machine, is changed. For this purpose, a temperature influencing unit in the form of an induction heater is provided for the device according to the invention, which is positioned between the merging unit and a roll-cladding unit arranged immediately downstream thereof. Such a change of the surface temperature is preferably implemented by an increase of the temperature, wherein said temperature influencing unit can be designed, for example, as a thermal radiator or the like, which is oriented onto the surface of a slab.

The quality of a bond of at least two material partners, from which the desired continuous strip-shaped composite material is produced, can furthermore be improved in that the slabs formed by solidification from the strands produced using the first/second casting machine are guided in a protective gas atmosphere. For this purpose, a protective gas unit is provided, which is arranged before the merging unit, and/or is designed as part of the merging unit and/or as part of a roll-cladding unit arranged directly downstream adjoining the merging unit. Accordingly, the slabs are guided in a protective gas atmosphere in the method according to the invention before step (ii) and/or during step (ii) and/or before step (iii). If the slabs consist of steel or a steel alloy, the formation of scale is at least reduced or even prevented in this way.

The bonding of the individual material partners can be improved if, before step (iii) and/or upstream of the roll-cladding unit, profiling of at least one strand produced using the first/second casting machine and/or a slab formed therefrom by solidification is performed. In such profiling, a strand or a slab formed therefrom can be diagonally chamfered on a lateral edge thereof. Additionally or alternatively, it can be provided in such profiling that a strand, preferably a slab formed therefrom, is trimmed by a vertical cut. In any case, it is ensured by the above-mentioned profiling that the at least two slabs, which are hot rolled in step (iii) and/or by the roll-cladding unit, also rest on one another and/or are aligned in relation to one another in the region of the edges thereof so that bonding of these slabs by the subsequent hot rolling is ensured in a homogeneous manner.

In one advantageous refinement of the invention, it can be provided that following step (iii), a material condition of the produced single continuous strip-shaped composite material is detected, preferably by x-rays and/or ultrasound. For this purpose, a measuring unit is provided for the device according to the invention downstream of a roll-cladding unit, by means of which an internal material condition of the produced single continuous strip-shaped composite material, in particular the bonding quality, can be detected. A process signal is then expediently generated on the basis of the detected material condition by a control unit, using which a control loop can be formed for the method according to the invention.

In one advantageous refinement of the invention, it can be provided that this method is carried out automatically as a function of at least one predetermined process variable. With reference to the preceding explanation of the invention, this process variable can consist, for example, of the speed which exists before step (ii) for the slabs formed by solidification from the strands, and/or the material condition of the produced continuous strip-shaped composite material. Furthermore, such a process variable can also be selected from the group formed in particular from the casting speed of the first/second casting machine, a change of the liquid-core reduction of the strands produced using the casting machines, a temperature difference of the individual slabs before step (ii) and/or before step (iii), a respective speed of the work rollers of the roll-cladding unit, and/or a thickness reduction which is achieved for the produced single strip-shaped composite material in step (iii). The method according to the invention can be designed as a control loop on the basis of the above-mentioned possible process variables and accordingly carried out automatically.

In one advantageous refinement of the invention, it can be provided that a speed of the respective work rollers of a roll-cladding unit is controlled in such a way that a possible "ski formation" of the strip-shaped composite material, which is hot rolled by the and/or in the roll-cladding unit, is counteracted during the exit from this roll-cladding unit. This is advisable in particular for a first roll-cladding unit, which is arranged downstream directly adjoining the merging unit. A further transportation of the produced continuous strip-shaped composite material in the rolling train is accordingly possible without a "ski formation" resulting at the front end of the produced strip-shaped composite material and thus damage to rolling stands downstream of the merging unit being a concern.

In one advantageous refinement of the invention, it can be provided that the produced continuous strip-shaped composite material is severed and/or isolated following step (iii) and/or downstream of a roll-cladding unit, which directly adjoins the merging unit, with the goal of improving following process steps and/or producing the lengths of the final product produced in this plant.

Additionally or alternatively, it can be provided that a hold-down device, by means of which a ski formation of the produced single continuous strip-shaped composite material is prevented, is positioned downstream of a roll-cladding unit directly adjoining the merging unit.

In one advantageous refinement of the invention, it can be provided that a third casting machine is provided, using which a further continuous strand is produced in step (i) of the method according to the invention. This third casting machine is also arranged in line with the roll-cladding unit, preferably upstream thereof. Subsequent steps (ii) and (iii) of the method according to the invention are accordingly carried out using a total of three slabs, which have each formed by solidification from the strands produced using the first, second, and third casting machine. Alternatively thereto, it can be provided that the slab which has formed by solidification from the strand produced using the third casting machine is bonded to the single continuous strip-shaped composite material already formed in step (iii) in the hot state with renewed performance of steps (ii) and (iii). For this case, the third casting machine is arranged downstream of a first roll-cladding unit, which is arranged directly adjoining the merging unit for the slabs which have formed by solidification from the strands produced using the first/second casting machine. In any case, if three casting machines are used, for example, a continuous strip-shaped composite material can be produced which consists, for example, in its uppermost and lowermost layer of steels having identical property profiles, wherein a middle layer of this composite material can be formed, for example, from a steel which differs in its properties from the materials used for the peripheral layers.

In one advantageous refinement of the invention, it can be provided that one or more intermediate layers in solid, liquid, or powdered form are introduced between the slabs to be merged. Such an intermediate layer can passivate or activate the opposing surfaces of the slabs. As a result the tendency toward scaling on the surfaces of the slabs is reduced, and/or the diffusion procedures between the material partners are advantageously influenced.

Further advantages of the present invention consist of the following aspects:
- greater thicknesses for the produced continuous strip-shaped composite material,
- higher production performance and improved cost-effectiveness,
- expansion of the steel types to be produced,
- higher degree of forming in comparison to conventional casting-rolling plants,
- production of heavy plates and of coils which consist of the produced continuous strip-shaped composite material,
- production of roll-clad heavy plates and coils, and
- possible substitution of both conventional cold rolling mills and also of material rolling in conventional hot rolling mills.

Exemplary embodiments of the invention are described in detail hereafter on the basis of a schematic simplified drawing.

BRIEF DESCRIPTION OF THE DRAWINGS

In the figures:

FIG. 4a shows side views of work rollers of a roll-cladding unit which is part of the device of FIG. 1 and/or FIG. 2, and FIG. 4b shows a side view of work rollers of a roll-cladding unit which is part of the device of FIG. 1 and/or FIG. 2.

DETAILED DESCRIPTION

Figure 1:
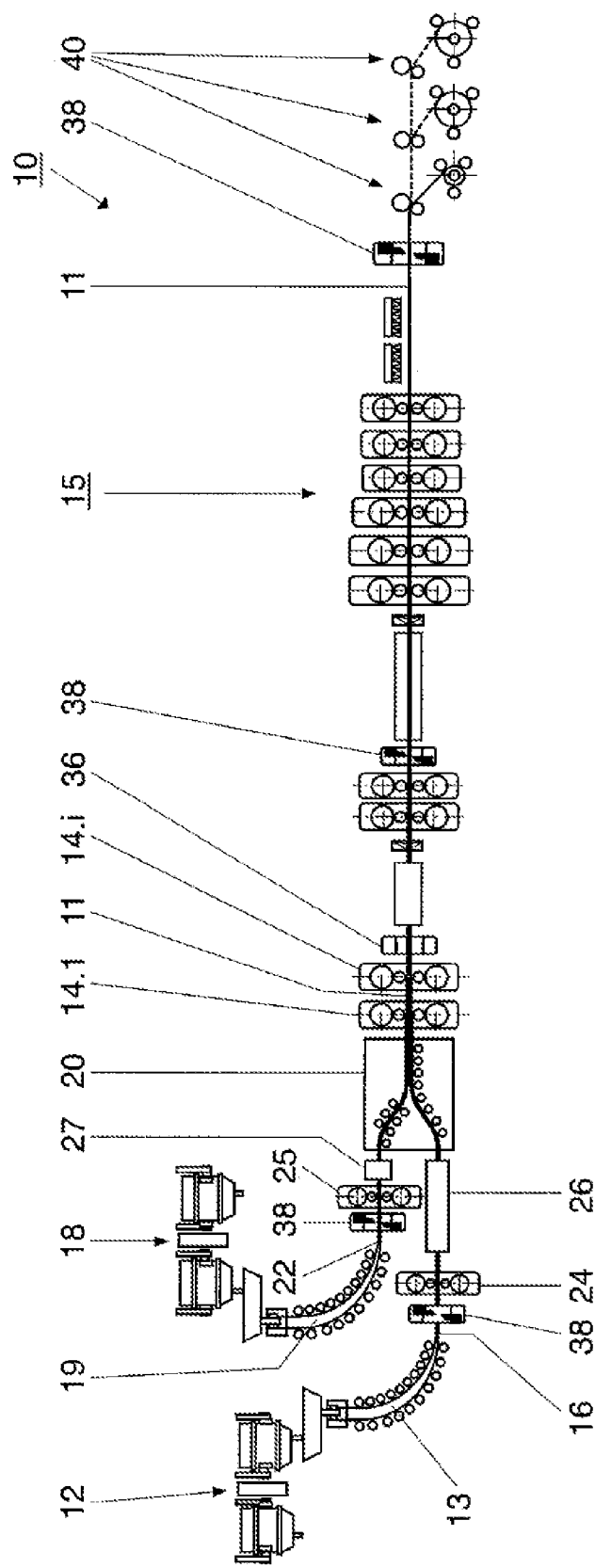
FIG. 1 shows a schematic side view of a device according to the invention, in which at least two casting machines are used.

Preferred embodiments of a device 10 according to the invention and components thereof are explained hereafter with reference to FIGS. 1 to 4, wherein this device 10 is used for producing a metal strip in the form of a continuous strip-shaped composite material 11. Identical features in the drawings are each provided with identical reference signs. It is to be especially noted here that the drawing is solely shown in simplified form and in particular is not to scale.

FIG. 1 shows a schematic simplified side view of the device 10 according to a first embodiment.

The device 10 comprises a first casting machine 12, using which a continuous strand 13 is produced, in particular from steel. The device 10 furthermore comprises a second casting machine 18, using which a continuous strand 19 is produced, in particular from steel or from another material (for example, a nonferrous metal). Slabs 16 and 22 form by solidification from the two strands 13 and 19, respectively, which slabs are subsequently guided through a merging unit 20, which is arranged downstream of the casting machines 12, 18, and in this way are moved in the direction toward each other. The device furthermore comprises at least one rolling stand in the form of a roll-cladding unit 14.1, which is arranged directly adjoining the merging unit 20 and therefore downstream thereof. The function of this roll-cladding unit 14.1 is also explained separately hereafter.

The merging unit 20 is used for the purpose of moving the two slabs 16 and 22 in the direction toward each other. In the embodiment shown in FIG. 1, it can be provided that the two slabs 16 and 22 already come into contact with one another inside the merging unit 20. According to an alternative embodiment of the merging unit 20, which is shown schematically simplified in the side view according to FIG. 3 and can also be used for the device of FIG. 1, it is provided that the two slabs 16 and 22 do not contact inside this merging device 20, but rather only outside and downstream thereof, when they run into the roll cladding device 14.1 positioned directly adjoining thereon.

Figure 2:
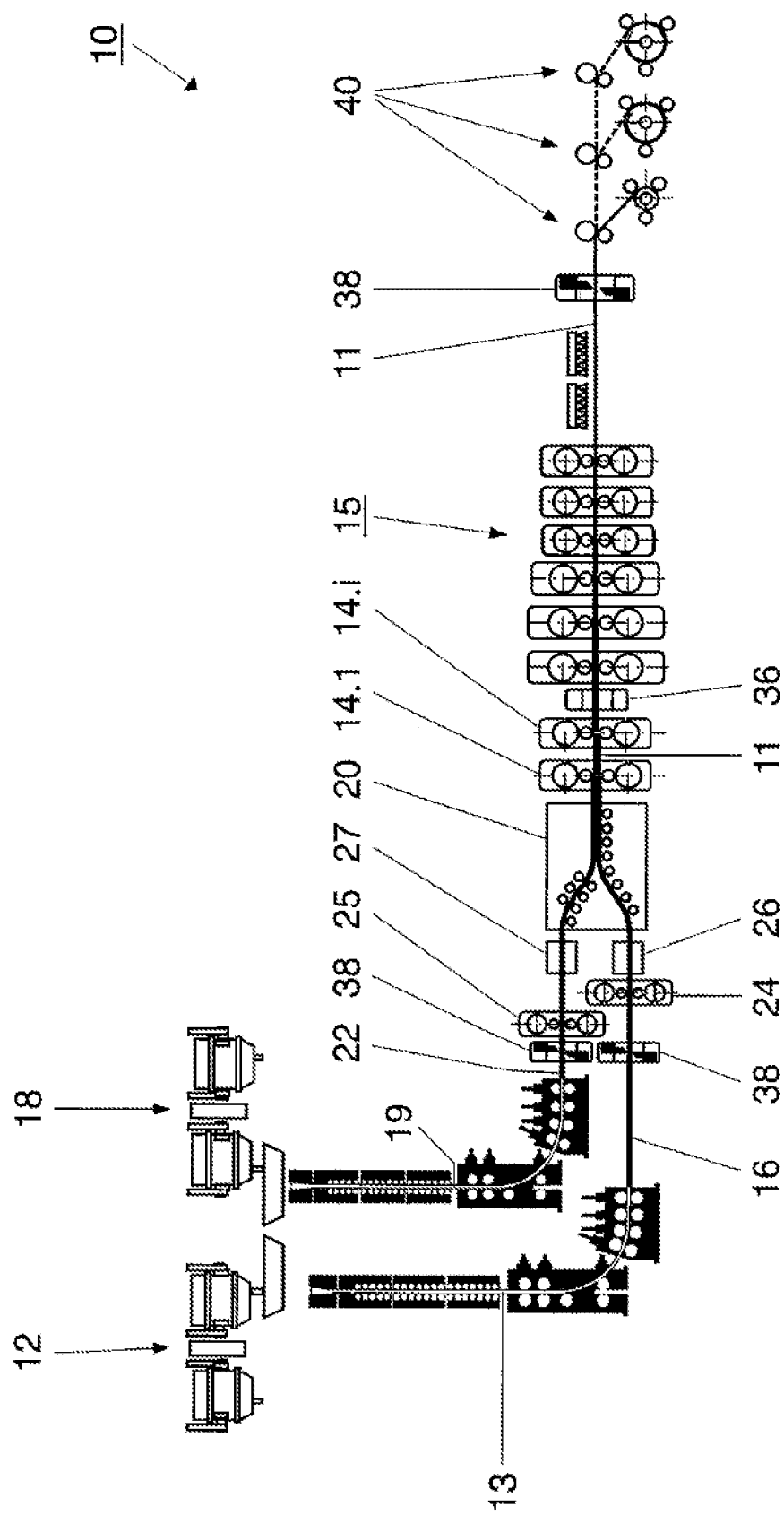
FIG. 2 shows a schematic side view of a device according to the invention according to a further embodiment.
Figure 3:
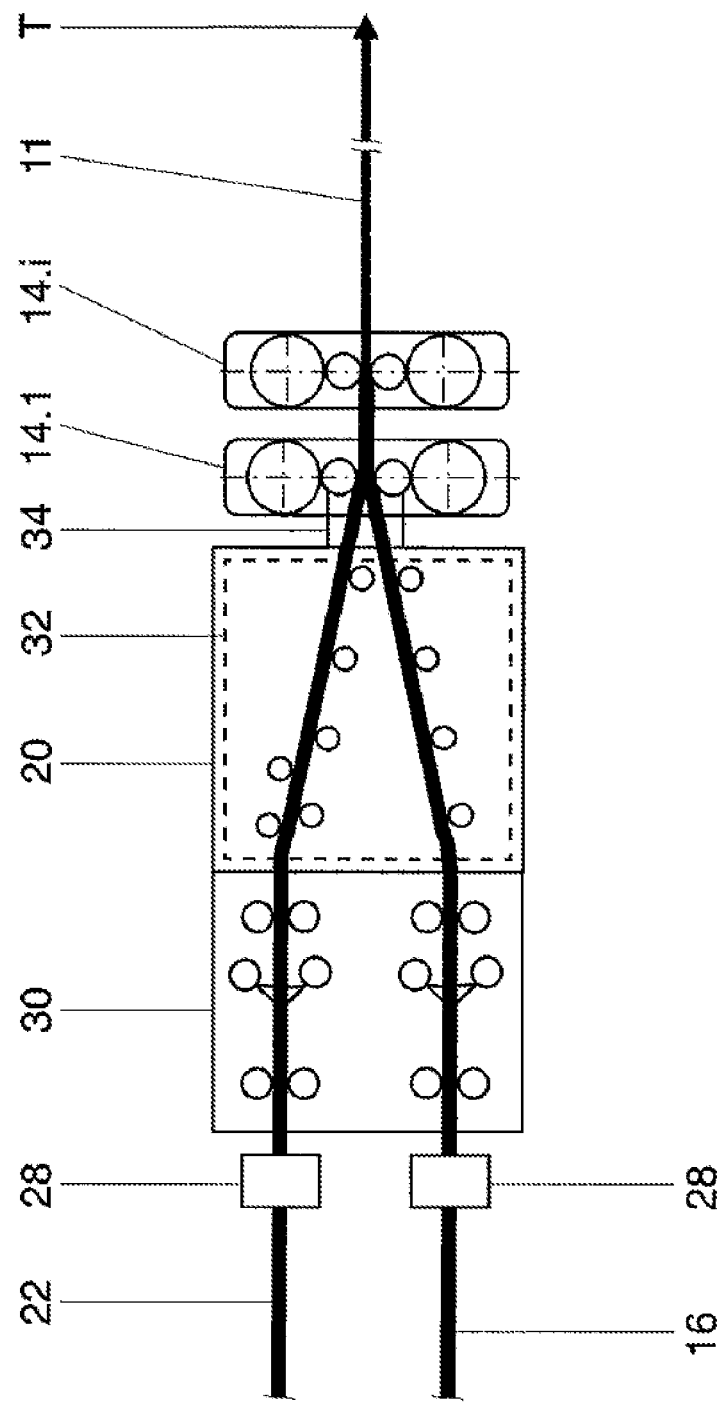
FIG. 3 shows a schematic side view of an alternative merging unit, which can be part of the device of FIG. 1/FIG. 2.

In FIG. 3, a transportation direction, in which the produced continuous strip-shaped composite material 11 is transported or moved (from left to right in the plane of the drawing), is indicated with the arrow "T". With respect to the illustrations of FIG. 1 and FIG. 2 it is apparent that the composite material 11 is moved therein in the same direction, namely from left to right (viewed in the plane of the drawing).

The device 10 has a first compensation rolling stand 24, which is arranged in line between the first casting machine 12 and the merging unit 20. Furthermore, the device 10 has a second compensation rolling stand 25, which is arranged in line between the second casting machine 18 and the merging unit 20. The slab 16, which is formed by solidification from the strand 13 produced using the first casting machine 12, is guided through the first compensation rolling stand 24. In the same manner, the slab 22, which is formed by solidification from the strand 19 produced using the second casting machine 18, is guided through the second compensation rolling stand 25. In this way it is possible to control, preferably to regulate, a speed of the slabs 16/22 in the direction of the merging unit 20 by means of the compensation rolling stands 24/25.

The device 10 comprises a first heating unit 26, which is arranged in line between the first casting machine 12 and the merging unit 20, and a second heating unit 27, which is arranged in line between the second casting machine 18 and the merging unit 20. The side view of FIG. 1 illustrates that the slabs 16 and 22 are guided through the first heating unit 26 or through the second heating unit 27, respectively. In this way, possible temperature differences which can occur as a result of a transportation route of differing length between the slab 16, which is formed by solidification from the strand 13 produced using the first casting machine 12, and the slab 22, which is formed by solidification from the strand 19 produced using the second casting machine 18, can be compensated for. As a result, the slabs 16/22 preferably enter the merging unit 20 at the same temperature.

The device 10 has lateral influencing units, which are each arranged upstream of the merging unit 20 and in line with the first casting machine 12 or with the second casting machine 18, respectively. These lateral influencing units are only symbolically indicated in the illustration of FIG. 3 by the reference sign "28" and can be formed, for example, by guide rulers. The slabs 16 and 22 are accordingly laterally guided by these guide rulers and thus aligned in relation to one another. It is particularly to be noted at this point that these lateral influencing units 28 can also be arranged inside the merging unit 20 and can thus be formed as part of this merging unit 20.

The above-mentioned roll-cladding unit 14.1 is used for the purpose of carrying out hot rolling for the at least two slabs 16 and 22 and thus producing a continuous strip-shaped composite material 11 therefrom by means of roll cladding. The side view of FIG. 4a shows in schematically simplified form a two-layer roll welding of two material partners, which can consist, for example, of the at least two slabs 16 and 22, when they come into contact with the work rollers A1, A2 of the roll-cladding unit 14.1 and are guided through between these work rollers A1, A2. It is apparent from the side view of FIG. 3 that a composite is formed from the two merged slabs 16 and 22, when they enter the roll-cladding unit 14.1 jointly, which composite is then hot rolled or roll clad by the work rollers A1, A2 of the roll-cladding unit.

Adjoining the roll-cladding unit 14.1 or downstream thereof, further rolling stands and/or roll-cladding units can be provided, using which hot rolling is carried out for the strip-shaped composite material 11. It is indicated in FIG. 1 by the reference sign "14.i" that at least one further roll-cladding unit or multiple such rolling stands can be arranged in the rolling train downstream of the roll-cladding unit 14.1. Furthermore, further rolling stands can be provided in the rolling train 15 adjoining the roll-cladding units 14.i.

The device 10 comprises—as shown in the illustration in FIG. 3—a cleaning unit in the form of a descaling unit 30, which is arranged upstream of the merging unit 20. The slabs 16 and 22 are suitably descaled by this descaling unit 30, which is advantageous in particular if at least one of the slabs or both slabs (each) consists/consist of steel or a steel alloy. Furthermore, the side view of FIG. 3 illustrates that the device 10 comprises a protective gas unit 32, which is integrated into the merging unit 20. The protective gas unit 32 is merely symbolized in simplified form by dashed lines in the illustration of FIG. 3. The slabs 16 and 22, before they are bonded with one another by the roll-cladding unit 14.1 by means of hot rolling or roll cladding, guided through the protective gas unit 32, which effectively prevents the formation of "fresh" scale on the opposing surfaces of the slabs 16 and 22.

The bonding of the at least two slabs 16 and 22 by means of the hot rolling in step (iii) can furthermore be improved in that a surface temperature of the slabs 16, 22 is influenced on the respective opposing sides thereof, preferably increased. For this purpose, a temperature influencing unit 34, which is shown in symbolically simplified form in the illustration of FIG. 3, is arranged directly upstream of the roll-cladding unit 14.1.

The device furthermore comprises at least one measuring unit 36, using which the internal material condition, in particular the bonding quality of the continuous strip-shaped composite material 11, which has been produced by means of hot rolling by the roll-cladding unit 14.1, can be detected. The measuring unit 36 is arranged, for example, behind or downstream of the roll-cladding unit 14.1, and preferably functions according to the principle of x-rays and/or ultrasound. For this purpose, it can be provided that associated sensors of the measuring unit 36 are arranged above and/or below the continuous strip-shaped composite material 11, so that an upper side and/or a lower side of the metal strip in the form of this composite material 11 can be examined therewith with respect to its material condition and/or surface quality.

In the embodiment of FIG. 1, the casting machines 12, 18 are each designed in the form of a curved apron continuous-casting unit.

Severing units 38, for example, in the form of flame cutting units, pendulum shears, drum shears, or the like, are arranged at various points along the strand guide. These severing units 38 enable cutting out and/or discharge of unusable material. Additionally or alternatively, a discontinuous rolling mode of individual strips and/or an emergency mode using only one of the casting machines 12, 18 can be implemented with use of these severing units 38. The severing can also be performed with the goal of improving the following process steps and/or producing the lengths of the final product produced in this plant. In this regard, it is to be noted that the positions of the respective severing units 38 shown in FIGS. 1 and 2 are only to be understood as examples.

At least one reel 40 is provided at the end of the rolling train 15 to wind the produced continuous strip-shaped composite material 11 into a coil. A plurality of such reels 40 can expediently also be provided, having corresponding units (not shown) for switching over between the individual reels 40. Additionally or alternatively, at least one shelf or the like can also be provided at the end of the rolling train 15, to remove plates or heavy plates therefrom.

FIG. 2 shows a side view of the device 10 according to the invention according to a further embodiment. In this case, identical features in comparison to the embodiment of FIG. 1 are each provided with identical reference signs. The embodiment of FIG. 2 differs from that of FIG. 1 in that the casting machines 12, 18 are each designed as a vertical continuous-casting unit, wherein the strands 13, 19 produced thereby enter vertically downward into a strand guiding system having cooling.

It is to be separately noted that the alternative merging unit 20 according to FIG. 3 can also be used in the embodiment of FIG. 2. Otherwise, the functionality of the embodiment according to FIG. 2 corresponds to that of FIG. 1, so that reference may be made to the explanations of FIG. 1 to avoid repetitions.

In addition to the embodiments according to FIG. 1 and FIG. 2, it can be provided that the device has a third casting machine (not shown). A further continuous strand, from which a further slab 23 can form (cf. FIG. 4b), is produced using such a third casting machine. This third casting machine can be arranged in line with the roll-cladding unit 14.1. Hot rolling or roll cladding of a total of three layers, which can consist of the slabs 16, 22, and 23, is illustrated in schematically simplified form in the side view of FIG. 4b. In this case, the two outer slabs 22, 23 can each be used as a cladding material, which can consist of one material or another material quality or steel quality in comparison to the base material in the form of the middle slabs 16.

The method according to the invention for producing the continuous strip-shaped composite material 11 can be carried out using the above-explained embodiments of the device 10 according to the invention as shown in FIG. 1 and FIG. 2. This method can be carried out automatically, and preferably in a regulated manner, as a function of at least one of the process variables mentioned at the outset.

LIST OF REFERENCE SIGNS 10 device
11 continuous strip-shaped composite material
12 first casting machine 13 continuous strand (produced by the first casting machine 12)
14.1 roll-cladding unit
14.*i* (further) roll-cladding unit(s)
15 rolling train
16 slab (formed from the strand 13)
18 second casting machine
19 continuous strand (produced by the second casting machine 18)
20 merging unit
22 slab (formed from the strand 19)
23 slab (formed from a strand which is produced using a third casting machine)
24 first compensation rolling stand
25 second compensation rolling stand
26 first heating unit (for example, induction heater)
27 second heating unit (for example, induction heater)
28 lateral influencing unit (for example, guide ruler)
30 cleaning unit (for example, descaling unit)
32 protective gas unit
34 temperature influencing unit
36 measuring unit
38 severing unit (for example, drum shears)
40 reel
A1, A2 work rollers (of the roll-cladding unit 14.1)
T transportation direction (for the strip-shaped composite material 11)

The invention claimed is:

1. A method for producing a continuous strip-shaped composite material, comprising:
producing at least one first continuous strand, from steel or from a steel alloy, by way of a first casting machine,
(i) producing at least one second continuous strand from steel or from a steel alloy by way of at least one second casting machine,
(ii) merging, by a merging unit, a first slab which is formed by solidification from the first strand produced by the first casting machine, and a second slab which is formed by solidification from the second strand produced by the second casting machine, in a hot state, in which the first slab and the second slab each have a temperature of at least 720° C., and
(iii) hot rolling, by a roll-cladding unit, a composite formed from the merged slabs, so that a single continuous strip-shaped composite material thus results by roll cladding,
wherein the first slab and the second slab are both heated, by a temperature influencing unit, before step (iii) such that a surface temperature of at least one of the first slab and the second slab is heated on a side which is facing the respective other slab,
wherein the temperature influencing unit is arranged immediately downstream of the merging unit and immediately upstream of the rolling stand, and
wherein before step (ii) and/or during step (ii) and/or before step (iii), the first slab and the second slab are laterally guided to align the slabs in relation to one another by at least one lateral influencing unit, wherein the lateral influencing unit is a guide ruler that is moved by an actuator in a direction of the center of the strip-shaped composite material.

2. The method as claimed in claim 1, wherein, before step (ii), a speed of at least one of the first slab and the second slab is controlled by guiding the at least one of the first slab and the second slab through a compensation rolling stand.

3. The method as claimed in claim 1, wherein at least one of the first slab and the second slab is heated before step (ii) such that the temperature of the first slab is the same as the temperature of the second slab.

4. The method as claimed in claim 1, wherein at least one of the first slab and the second slab is cleaned before step (ii).

5. The method as claimed in claim 1, wherein before step (ii) and/or during step (ii) and/or before step (iii) and/or during step (iii), the first slab and the second slab are guided in a protective gas atmosphere.

6. The method as claimed in claim 1, wherein, following step (iii), a bonding quality of the produced single continuous strip-shaped composite material is detected, by one or both of x-rays and ultrasound, a process signal is generated by a control unit on the basis of the detected bonding quality, and a control loop is formed for the method on the basis of the process signal.

7. The method as claimed in claim 1, wherein the method is carried out automatically as a control loop based on at least one pre-determined process variable, wherein the process variable is one or more of: the speed of one or more of the first casting machine and the second casting machine, a change of a liquid-core reduction of the strands produced using the casting machines, the speed of the slabs formed by solidification from the strands present before step (ii), a temperature difference of the individual slabs before step (ii) and/or before step (iii), a respective speed of the work rollers of the roll-cladding unit, a detected bonding quality of the produced single continuous strip-shaped composite material, and a thickness reduction achieved in step (iii) of the produced single strip-shaped composite material.

8. The method as claimed in claim 1, wherein the first strand and second strand produced using the first casting machine and the second casting machine, respectively, each have different material qualities, and a third continuous strand is produced by a third casting machine in step (i), wherein steps (ii) and (iii) are carried out using three slabs, which have each formed by solidification from the strands produced using the first, second, and third casting machine.

9. The method as claimed in claim 8, wherein the third slab which is formed by solidification from the strand produced using the third casting machine is bonded to the single continuous strip-shaped composite material already formed in step (iii) in the hot state with renewed performance of steps (ii) and (iii).

10. The method as claimed in claim 1, wherein at least one intermediate layer in solid, liquid, or powdered form is introduced between the slabs to be merged, which passivates or activates the surfaces of the slabs opposite to one another.

11. A device for producing a continuous strip-shaped composite material, comprising:
at least one first casting machine, using which a first continuous strand is produced;
at least one rolling stand, which is arranged in line with the first casting machine and downstream thereof, wherein a fully solidified slab of the first strand is hot rolled;
at least one second casting machine, using which a second continuous strand is produced from metal, the second casting machine being arranged in line with the rolling stand and upstream thereof;
a merging unit arranged between the casting machines and the rolling stand, the merging unit being adapted to move toward each other, in a hot state, a first slab, which is formed by solidification from the first strand produced using the first casting machine, and a second slab, which is formed by solidification from the second strand produced using the second casting machine;
at least one temperature influencing unit arranged immediately downstream of the merging unit and immediately upstream of the rolling stand, the temperature influencing unit being adapted to increase the surface temperature of at least one of the first slab and the second slab on a side opposite to the respective other slab; and at least one lateral influencing unit arranged at one or more of up-stream of the merging unit, as a part of the merging unit, and upstream of the roll-cladding unit;

wherein the rolling stand is a roll-cladding unit adapted to hot roll a composite formed from the merged slabs, such that a single continuous strip-shaped composite material is produced by roll cladding;

wherein the first slab and the second slab are brought into contact on the lateral edges of the respective slab with the lateral influencing unit to be laterally aligned in relation to one another; and wherein the at least one lateral influencing unit is a guide ruler that is movable in a direction of the center of the strip-shaped composite material.

12. The device as claimed in claim 11, further comprising:
one or more of a first compensation rolling stand and a second compensation rolling stand, the first compensation rolling stand being arranged in line between the first casting machine and the merging unit, and
the second compensation rolling stand being arranged in line between the second casting machine and the merging unit.

13. The device as claimed in claim 11, further comprising:
at least one heating unit, the heating unit being provided at one or both of upstream of the merging unit and as a part of the merging unit;
wherein the one or more of the first slab and the second slab is guided through the heating unit; and
wherein one separate heating unit is provided per slab.

14. The device as claimed in claim 11, further comprising:
at least one cleaning unit arranged between the casting machines and the merging unit, the at least one cleaning unit being adapted to clean a slab formed by solidification from the strands produced using the casting machines.

15. The device as claimed in claim 11, further comprising a protective gas unit provided at one or more of before the merging unit, as part of the merging unit, and as part of a roll-cladding unit arranged downstream of and adjoining the merging unit, wherein at least one of the first slab and the second slab is guided inside the protective gas unit in a protective gas atmosphere.

16. The device as claimed in claim 11, further comprising a measuring unit arranged downstream of the roll-cladding unit, the measuring unit being adapted to detect a bonding quality of the produced single continuous strip-shaped composite material.

17. The device as claimed in claim 11, further comprising at least one third casting machine arranged in line with the roll-cladding unit, the at least one third casting machine producing a third continuous strand.

* * * * *